United States Patent [19]

Rolland et al.

[11] Patent Number: 4,821,403

[45] Date of Patent: Apr. 18, 1989

[54] METHOD FOR MAKING A FLAT MAGNETIC STRUCTURE FOR READ/WRITE MAGNETIC HEADS

[75] Inventors: Jean-Luc Rolland; Paul L. Meunier, both of Paris; Jean-Claude Mage, Levallois Perret, all of France

[73] Assignee: Compagnie Europeene de Composants Electroniques LCC, Courbevoie, France

[21] Appl. No.: 113,481

[22] Filed: Oct. 28, 1987

[30] Foreign Application Priority Data

Oct. 28, 1986 [FR] France ............... 86 14975

[51] Int. Cl.4 .................................. G11B 5/42
[52] U.S. Cl. .................................. 29/603; 360/123; 360/126
[58] Field of Search ............ 29/603, 602 R; 360/123, 360/125-127

[56] References Cited

U.S. PATENT DOCUMENTS

| | | |
|---|---|---|
| 3,478,341 | 11/1969 | Trimble et al. |
| 3,672,043 | 6/1972 | Trimble et al. |
| 4,253,231 | 3/1981 | Nouet ............... 29/602.1 |
| 4,731,157 | 3/1988 | Lazzari ............... 29/603 X |

FOREIGN PATENT DOCUMENTS

| | | |
|---|---|---|
| 2108406 | 5/1972 | France. |
| 57-53815 | 3/1982 | Japan. |
| 57-98120 | 6/1982 | Japan. |
| 57-205810 | 12/1982 | Japan. |
| 58-85916 | 5/1983 | Japan. |
| 61-9813 | 1/1986 | Japan. |
| 61-34715 | 2/1986 | Japan. |

Primary Examiner—Carl E. Hall
Attorney, Agent, or Firm—Oblon, Fisher, Spivak, McClelland & Maier

[57] ABSTRACT

A method of making a flat magnetic structure having coils thereon, said structure including magnetic read/write heads using a flat substrate that has at least one side made of a magnetic material, said method including the steps of: initial machining of the magnetic side of the substrate to form supporting means for conducting wires, which forms said coils, and to demarcate future magnetic poles of said magnetic read/write heads; then depositing, on either side or both sides of the substrate, connecting pins at a rate of two pins per said coil; then positioning the conducting wires on said supporting means to form the coils; then connecting the ends of the conducting wires of each coil to the corresponding connecting pins; then coating the machined magnetic side with an insulating material; and then machining and polishing the coated side until the magnetic poles are exposed.

16 Claims, 4 Drawing Sheets

FIG_1
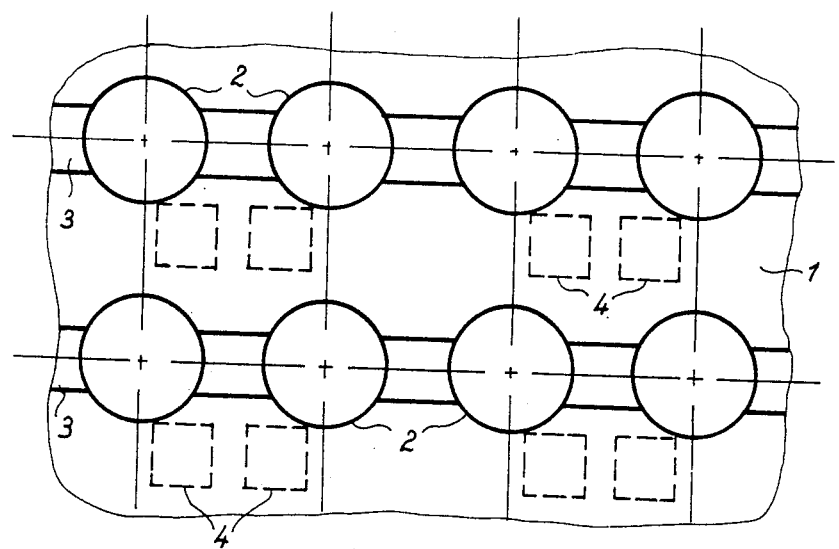

FIG_2
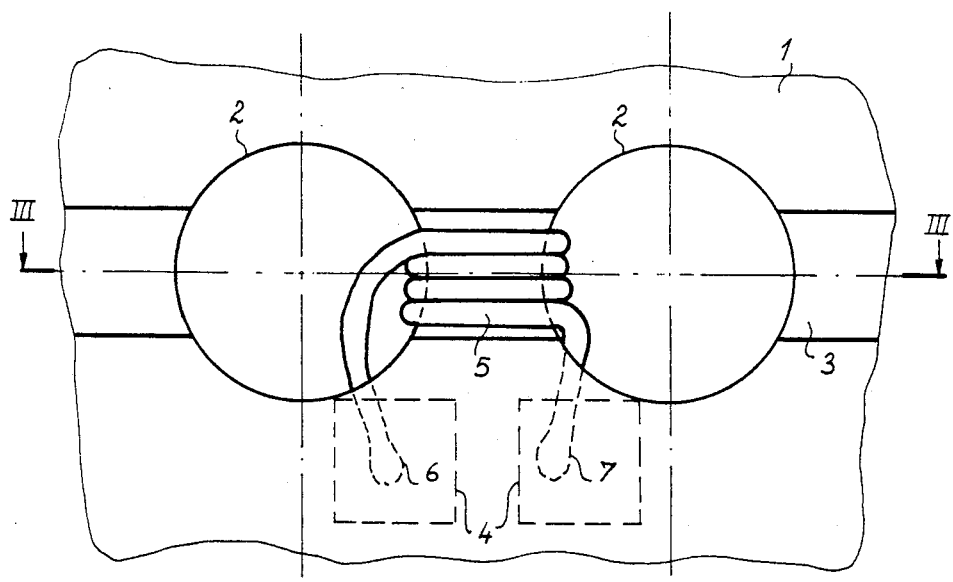
FIG_3
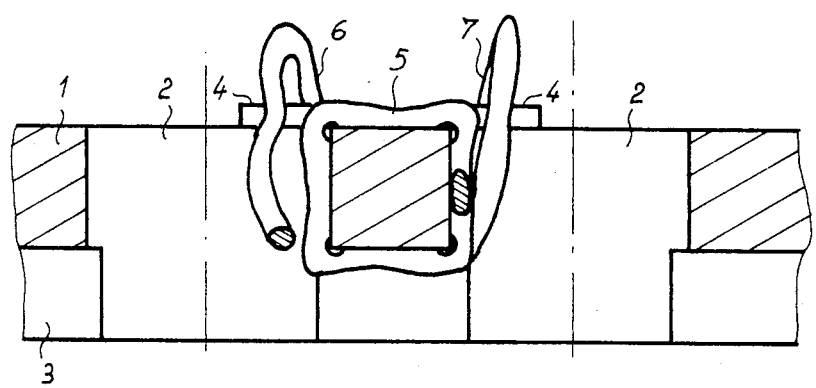

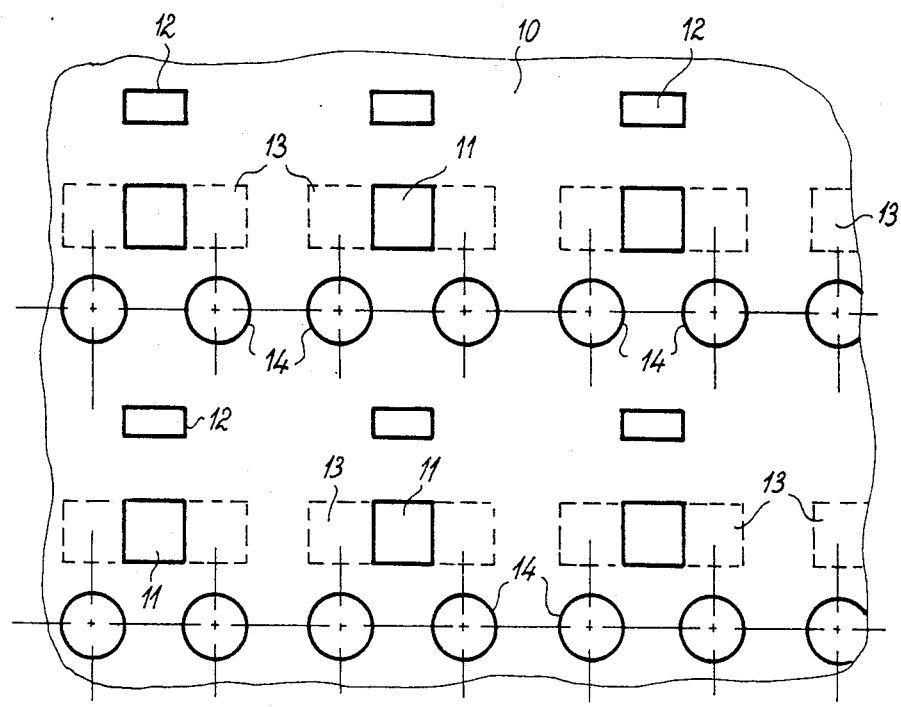
FIG_4

FIG_5
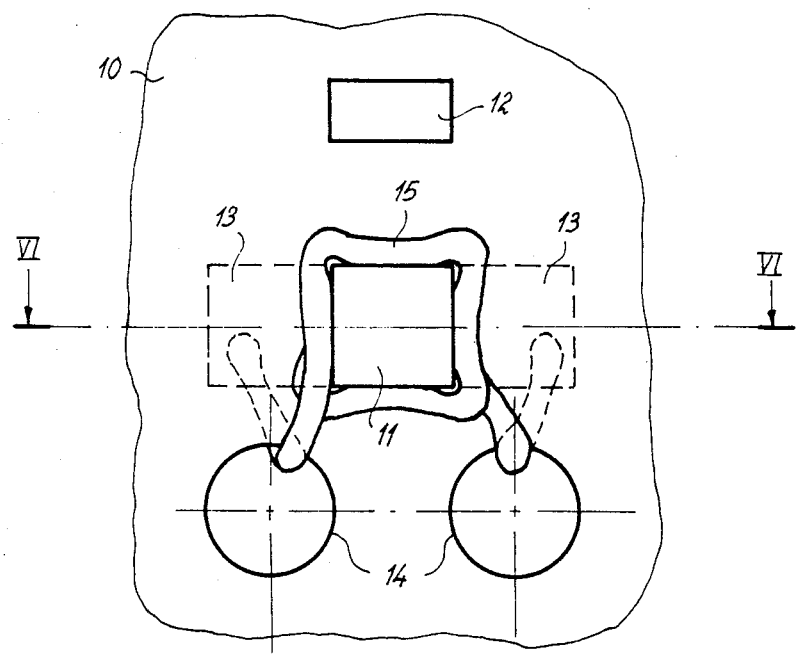
FIG_6
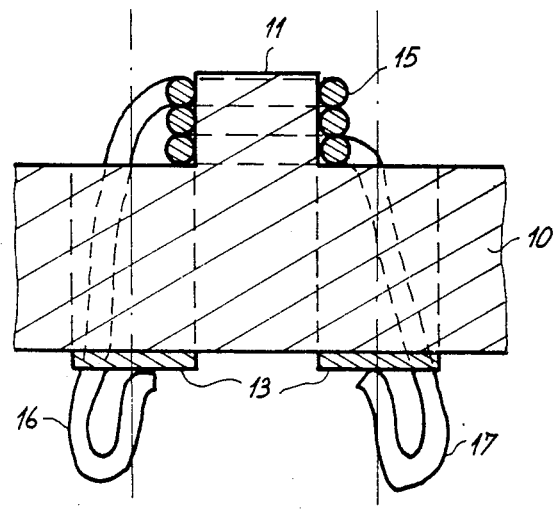

METHOD FOR MAKING A FLAT MAGNETIC STRUCTURE FOR READ/WRITE MAGNETIC HEADS

BACKGROUND OF THE INVENTION

1. Field of the Invention

A method for making a flat magnetic support comprising several coils. It can be applied to the field of magnetic recording, especially for the manufacture of read/write heads using thin-film technologies.

2. Description of the Prior Art

Magnetic supports for magnetic read/write heads can be classified under two groups. The first group relates to magnetic heads made of two parts bonded together and mounted on a support. These heads have the disadvantage of being made entirely by hand. The second group relates to magnetic heads made as thin films on a non-magnetic substrate, for example, silicon. These heads are entirely integrated. The making of these heads requires a series of masks and attacking operations for etching. Their disadvantage therefore is that they are expensive and take long to make.

SUMMARY OF THE INVENTION

To remove these disadvantages, the invention proposes to make a magnetic support using a flat substrate which is machined so as to obtain several housings or coil supports, the coils being subsequently connected to conducting pins deposited on the substrate. The invention can be used for the series-production of magnetic supports, reducing manual or masking operations to the minimum.

A method for making a flat coiled magnetic support for magnetic read/write heads according to the invention using a substrate that has at least one side made of a magnetic material comprises the following steps:

the machining of the magnetic side of the substrate in order to make supporting means for conducting wires, designed to form coils, and in order to demarcate future magnetic poles;

the depositing, on either side or both sides of the substrate, of connecting pins at a rate of two pins per coil;

the positioning of the conducting wires to form the coils;

the connecting of the ends of the wires of each coil to the corresponding connecting pins;

the coating of the machined magnetic side with an insulating material; and the machining and polishing of the coated side until the magnetic poles are exposed.

Another method according to the invention for making a flat coiled magnetic support for magnetic read/write heads with a non-magnetic substrate comprises the following steps:

the initial machining of one of the sides of the substrate in order to make supporting means for conducting wires, designed to form the coils, and in order to demarcate the future magnetic poles;

the depositing of a magnetic material on the side;

the depositing, on either side of the substrate, of connection pins at a rate of two pins per coil;

the positioning of conducting wires to form the coils;

the connecting of the ends of the wires of each coil to the corresponding connecting pins;

the coating of the magnetic side of the support with an insulating material; and the machining and polishing of the coated side until the magnetic poles are exposed.

BRIEF DESCRIPTION OF THE DRAWINGS

The invention will be better understood and its other advantages will emerge from the following description, given as a non-exhaustive example, with reference to the appended figures.

FIG. 1 is a topview of a magnetic substrate obtained by the method according to the invention.

FIGS. 2 and 3 are detailed views of the substrate of FIG. 1 with a coil in position.

FIG. 4 is a topview of another magnetic substrate obtained by the method according to the invention.

FIGS. 5 and 6 are detailed views of the substrate of FIG. 4 with a coil in position.

DESCRIPTION OF THE PREFERRED EMBODIMENTS

The method according to the invention has several possible alternative embodiments depending on the direction that the coil axes are made to take with respect to the plane of the substrate. The description will pertain more precisely to two particular embodiments. In a first embodiment the axes of the coils will be parallel to the plane of the substrate. In a second embodiment, these axes will be perpendicular to the substrate. It should be clearly understood that any other direction or combination of directions between the coil axes and the plane of the substrate comes within the scope of the invention.

FIG. 1 is a top view of a magnetic substrate 1 designed to receive coils, the axes of which will be parallel to the plane of the support. The substrate 1 is, in this case, a thin plate of magnetic material, made of ferrite for example. The thickness of the plate depends on the application for which it is intended (for example, digital equipment, sound equipment, etc.). The plate is machined to obtain holes 2 which may or may not be evenly spaced out and which cross its entire thickness. The holes 2 will enable the coil wires to pass through. The diameter of the holes and their distribution on the support will be suited to the coil and to the magnetic head which will be made later. At present, the smallest coil wire diameters to be considered are about 30 microns. After this, grooves 3, parallel to one another, are made, each groove 3 having its axis of symmetry in the same line as the axis of a row of holes 2. The portion of the groove 3 that joins two consecutive holes 2 thus defines a housing that can receive a coil. The dimensions of the groove 3 will be adapted to the characteristics of the coils 2. Connection pins 4 are then made. Advantageously, these pins will be made on the side of the substrate 1 opposite to the grooves 3 in order to prevent wires from jutting out of the grooves 3. If the insulation provided by the magnetic material forming the substrate 1 is not sufficient, it will be necessary to interpose an insulating material between the substrate 1 and the connection pins 4. Two connecting pins 4 will correspond to each coil housing. For reasons of space, the connection pins 4 are set as close as possible to the corresponding coil housing as shown in FIG. 1. The connection pins 4 are made, for example, by depositing a conducting material (by screen process printing, sputtering, coating or other method). The conducting material may be gold, copper, silver, etc. The connection pins 4 are designed to take the ends of the coils.

A conducting wire is wound in each of the housings designed for this purpose, and the ends of each coil are connected to the connection pins 4. Depending on the circumstances, one and the same holes can be used to make two coils. The coil ends can be connected to the connection pins 4 by various methods known to the specialist, such as welding, thermocompression etc.

FIGS. 2 and 3 are detailed views of a magnetic support according to the invention and show the setting of a coil 5 in its housing. FIG. 2 is a section view along the line III—III in FIG. 2. The ends 6 and 7 of the coil 5 are connected to the connection pins 3.

The side of the magnetic substrate 1 that has the grooves 3 is then coated with an insulating material (such as glass with a low melting, temperature resin, etc.) which fixes the coils 5 in their housings and covers the holes 2. The coating is done so as to cover the entire surface of the substrate 1. This same surface is then machined and polished so as to obtain a flat surface on which magnetic surfaces alternate with insulating surfaces. The grooves 3 are deep enough for the coils 5 not to come out of their housings. By sawing along the length and width of the magnetic support thus made, individual elements are obtained each with a coil 5 that ends in two connection pins 4 and one magnetic circuit having its poles separated by an insulating material.

FIG. 4 is a topview of a magnetic substrate 10 designed to receive coils, the axes of which will be perpendicular to the plane of the magnetic substrate 10. Two series of notches are made on the surface of the substrate 10. These notches are made, for example, along the width and length of the plate forming the substrate 10. They are evenly spaced out and define the pins 11 and 12 which may have identical or different dimensions as can be seen in FIG. 4. The pins 11 are designed to take the coils which determine the size of the coil pins.

Connecting pins 13 are then deposited on the other side of the substrate 10. The connecting pins 13 can be obtained as indicated above. They are designed to take the ends of the coils which will be positioned around the pins 11. To enable these coil ends to pass through, holes 14 are drilled into the thickness of the substrate at a rate of two holes per coil. To make the final sawing operation easier, it is preferable to provide one hole per coil wire as shown in FIG. 4. If the ends of the two coils are to be put into the same hole, the holes will be preferably machined in the shape of elongated openings in order to make the sawing operation easier.

Conducting wire is then coiled around the pins 11. The ends of the coils are inserted into those holes 14 which are closest to the corresponding coil pin, and they are connected to the connecting pins 13 located on the other side of the substrate 10.

FIGS. 5 and 6 are detailed views of the magnetic support of FIG. 4. FIG. 6 is a section along the line VI—VI in FIG. 5. It shows the arrangement of a coil 15 which has its ends 16 and 17 connected to the connecting pins 13 after going through the holes 14.

The surface of the substrate 10 that supports the coils is coated, as above, with an insulating material which fixes the coils around their pins. The coating is done so as to cover the entire surface of the substrate. After machining and polishing, this supporting surface has magnetic surfaces which are flush with an insulating surface. By sawing the support, individual elements are obtained each having one coil, buried in the insulating material and accessible by two connecting pins, and one magnetic circuit with its poles formed by the pins 11 and 12.

Another advantage of the method according to the invention is that it makes it possible to manufacture a flat magnetic support comprising a large number of small coils.

Other embodiments are also possible within the scope of the invention. The substrate used as the start may be formed of a plate of non-magnetic material lined with a material of magnetic material. A substrate of non-magnetic material may be first machined, and then the machined surface may be lined with a magnetic material. In this case, the magnetic layer deposited (by sputtering, electrolytic growth, CVD technology, etc.) may be about 2 to 20 microns thick. The connecting pins may be located on the machined side, and in the embodiment shown in FIGS. 4 to 6, the holes that go through the substrate would then become unnecessary. The connecting pins may also be deposited on both sides of the substrate. The substrate can be machined by chemical means. For example, a silicon substrate can be etched with a base according to the techniques used in VMOS technology.

The method according to the invention may be complemented by the addition, to the magnetic support, of elements needed to constitute magnetic heads and followed by an operation for cutting out the magnetic head obtained all together. The magnetic heads can be cut out by mechanical sawing, using a laser ray, by chemical means or by any other appropriate method.

What is claimed is:

1. A method of making a flat magnetic structure having coils thereon, said structure including magnetic read/write heads using a flat substrate that has at least one side made of a magnetic material, said method comprising the steps of:
   (a) initial machining of the magnetic side of the substrate to form supporting means for conducting wires, which forms said coils, and to demarcate future magnetic poles of said magnetic read/write heads; then
   (b) depositing, on either side or both sides of the substrate, connecting pins at a rate of two pins per said coil; then
   (c) positioning the conducting wires on said supporting means to form the coils, then
   (d) connecting the ends of the conducting wires of each coil to the corresponding connecting pins; then
   (e) coating the machined magnetic side with an insulating material; and then
   (f) machining and polishing the coated side until the magnetic poles are exposed.

2. A method according to claim 1 wherein the initial machining of the substrate comprises drilling holes through the substrate and making grooves, with one groove joining at least two said holes, thereby defining said supporting means for said coil.

3. A method according to claim 1 wherein the initial machining of the substrate comprises:
   (a) making transverse and longitudinal grooves so as to define pins used to support the coils so as to define magnetic poles and
   (b) drilling holes through the substrate, the holes enabling the connection of the ends of the coils to the connecting pins placed on that side of the substrate which is opposite to the side having the coils.

4. A method according to claim 1 wherein the initial machining of the substrate is done by chemical means.

5. A method according to claim 1 and comprising the further steps of:
   (a) fitting the magnetic structure with the elements needed to constitute magnetic heads and then
   (b) cutting the structure to form a plurality of said magnetic heads.

6. A method according to claim 5 wherein the cutting is done by mechanical sawing.

7. A method according to claim 5 wherein the cutting is done with a laser beam.

8. A method according to claim 5 wherein the cutting is done by chemical means.

9. A method of making a flat magnetic structure having coils thereon, said structure including magnetic read/wire heads with a flat non-magnetic substrate, said method comprising the steps of:
   (a) initial machining of one of the sides of the substrate to form supporting means for conducting wires, which forms said coils, and to demarcate the future magnetic poles of said magnetic read/write heads; then
   (b) depositing a magnetic material on said side; then
   (c) depositing, on either side or both sides of the substrate, connection pins at a rate of two pins per said coil; then
   (d) positioning the conducting wires on said supporting means to form the coils; then
   (e) connecting the ends of the conducting wires of each coil to the corresponding connecting pins; then
   (f) coating the magnetic side of the support with an insulating material; and then
   (g) machining and polishing the coated side until the magnetic poles are exposed.

10. A method according to claim 9 wherein the initial machining of the substrate comprises drilling holes through the substrate and making grooves, with one groove joining at least two said holes, thereby defining said supporting means for said coil.

11. A method according to claim 9 wherein the initial machining of the substrate comprises:
   (a) making transverse and longitudinal grooves so as to define pins used to support the coils and so as to define magnetic poles and
   (b) drilling holes through the substrate, the holes enabling the connection of the ends of the coils to the connecting pins places on that side of the substrate which is opposite to the side having the coils.

12. A method according to claim 9 wherein the initial machining of the substrate is done by chemical means.

13. A method according to claim 9 and comprising the further steps of:
   (a) fitting the magnetic structure with the elements needed to constitute magnetic heads and then
   (b) cutting the structure to form a plurality of said magnetic heads.

14. A method according to claim 13 wherein the cutting is done by mechanical sawing.

15. A method according to claim 13 wherein the cutting is done with a laser beam.

16. A method according to claim 13 wherein the cutting is done by chemical means.

* * * * *